US009688224B2

(12) United States Patent
Takahashi et al.

(10) Patent No.: US 9,688,224 B2
(45) Date of Patent: Jun. 27, 2017

(54) VEHICLE ELECTRIC POWER SUPPLY APPARATUS

(71) Applicant: HONDA MOTOR CO., LTD., Tokyo (JP)

(72) Inventors: Yusuke Takahashi, Utsunomiya (JP); Satoshi Sekiguchi, Shimotsuke (JP); Takushi Inoue, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 476 days.

(21) Appl. No.: 14/298,132

(22) Filed: Jun. 6, 2014

(65) Prior Publication Data

US 2015/0008731 A1  Jan. 8, 2015

(30) Foreign Application Priority Data

Jul. 2, 2013  (JP) .................................. 2013-139149

(51) Int. Cl.
*B60R 16/03* (2006.01)
*F02N 11/08* (2006.01)

(52) U.S. Cl.
CPC .......... *B60R 16/03* (2013.01); *F02N 11/0866* (2013.01); *F02N 2011/0885* (2013.01);
(Continued)

(58) Field of Classification Search
None
See application file for complete search history.

(56) References Cited

U.S. PATENT DOCUMENTS 9,458,813 B2 * 10/2016 Sekiguchi ................. B60L 7/10
2008/0210187 A1 * 9/2008 Sugano ............... F02N 11/0803
123/179.3
(Continued)

FOREIGN PATENT DOCUMENTS

CN     101614177     12/2009
DE   102007022522    11/2008
(Continued)

OTHER PUBLICATIONS

Chinese Office Action with English translation dated Dec. 2, 2015, 13 pages.
(Continued)

*Primary Examiner* — Jared Fureman
*Assistant Examiner* — Aqeel Bukhari
(74) *Attorney, Agent, or Firm* — Rankin, Hill & Clark LLP

(57) ABSTRACT

A vehicle electric power supply apparatus includes first and second power sources connected in parallel to each other; a DC-DC converter connected between the first and second power sources; a switch connected in parallel to the DC-DC converter and connected between the first and second power sources; an opening and closing unit that is operable to open and close the switch; and a control unit that controls the DC-DC converter and the opening and closing unit. When an internal combustion engine is stopped, the control unit sets the switch to be OFF using the opening and closing unit, and the control unit causes the second power source to be discharged and the first power source to be charged until the output voltage of the second power source reaches a first voltage by electric power supply from the second power source to the first power source via the DC-DC converter.

7 Claims, 15 Drawing Sheets

(52) U.S. Cl.
CPC . *F02N 2011/0888* (2013.01); *F02N 2200/022* (2013.01); *F02N 2200/063* (2013.01)

(56) References Cited

U.S. PATENT DOCUMENTS

| | | | |
|---|---|---|---|
| 2012/0163035 A1* | 6/2012 | Song | H02M 3/33584 363/17 |
| 2012/0296506 A1 | 11/2012 | Kotani et al. | |
| 2013/0119923 A1* | 5/2013 | Wright | H02J 7/0073 320/107 |
| 2013/0257446 A1* | 10/2013 | Soell | B60L 11/1803 324/503 |

FOREIGN PATENT DOCUMENTS

| | | |
|---|---|---|
| FR | 2923551 | 5/2009 |
| FR | 2935558 | 3/2010 |
| FR | 2964511 | 3/2012 |
| JP | 2010-023766 | 2/2010 |
| JP | 2010-083178 | 4/2010 |
| JP | 2010-195336 | 9/2010 |
| JP | 2012-240486 | 12/2012 |
| JP | 2013-023103 | 2/2013 |

OTHER PUBLICATIONS

European Search Report dated Jul. 29, 2015, 4 pages.
Japanese Office Action with English Translation, dated Apr. 21, 2015, 5 pages.

\* cited by examiner

VEHICLE ELECTRIC POWER SUPPLY APPARATUS

Priority is claimed on Japanese Patent Application No. 2013-139149, filed on Jul. 2, 2013, the contents of which are incorporated herein by reference.

BACKGROUND

Field of the Invention

The present invention relates to a vehicle electric power supply apparatus.

Background

In the related art, a vehicle electric power supply apparatus which includes a DC-DC converter connecting a main power source and an auxiliary power source connected to an electric load and includes a switch between the main power source and the auxiliary power source is known (for example, refer to Japanese Unexamined Patent Application Publication No. 2010-195336).

SUMMARY

In the vehicle electric power supply apparatus according to the above related art, it is desired to prevent an excess voltage reduction and an increase of a dark current due to self-discharge of the main power source or the auxiliary power source when the vehicle is stopped.

In view of the foregoing, an object of an aspect of the present invention is to provide a vehicle electric power supply apparatus capable of suppressing self-discharge of a first power source and a second power source when the vehicle is stopped.

In order to achieve the above object, a vehicle electric power supply apparatus according to an aspect of the present invention adopts one of the configurations described below.

(1) An aspect of the present invention is a vehicle electric power supply apparatus mounted in a vehicle, the vehicle being provided with an internal combustion engine and an operation switch which is used to output a signal that commands starting and stopping of the internal combustion engine corresponding to an operation of an operator, the apparatus including: a first power source; a second power source that is connected in parallel to the first power source; a DC-DC converter that is connected between the first power source and the second power source; a switch that is connected in parallel to the DC-DC converter and is connected between the first power source and the second power source; an opening and closing unit that is used to open and close the switch; and a control unit that controls the DC-DC converter and the opening and closing unit, wherein, when the internal combustion engine is stopped corresponding to a signal that is output from the operation switch, the control unit sets the switch to be OFF using the opening and closing unit, and the control unit causes the second power source to be discharged and the first power source to be charged until the output voltage of the second power source reaches a first voltage by electric power supply from the second power source to the first power source via the DC-DC converter.

(2) In the aspect of (1) described above, when the internal combustion engine is operated corresponding to a signal that is output from the operation switch, the control unit may set an output voltage of the second power source to a second voltage that is greater than the first voltage by charging and discharging the second power source via the DC-DC converter.

According to the aspect of (1) described above, with respect to the second power source which easily self-discharges compared to the first power source, since the electric power supply from the second power source to the first power source is performed when the internal combustion engine is stopped, it is possible to reduce the self-discharge and the dark current of the second power source.

According to the aspect of (2) described above, since the output voltage of the second power source is decreased to the first voltage from the second voltage when the internal combustion engine is stopped, it is possible to reduce the self-discharge and the dark current of the second power source.

DESCRIPTION OF THE EMBODIMENTS

Hereinafter, a vehicle electric power supply apparatus according to an embodiment of the present invention will be described with reference to the accompanying drawings.

Figure 1:
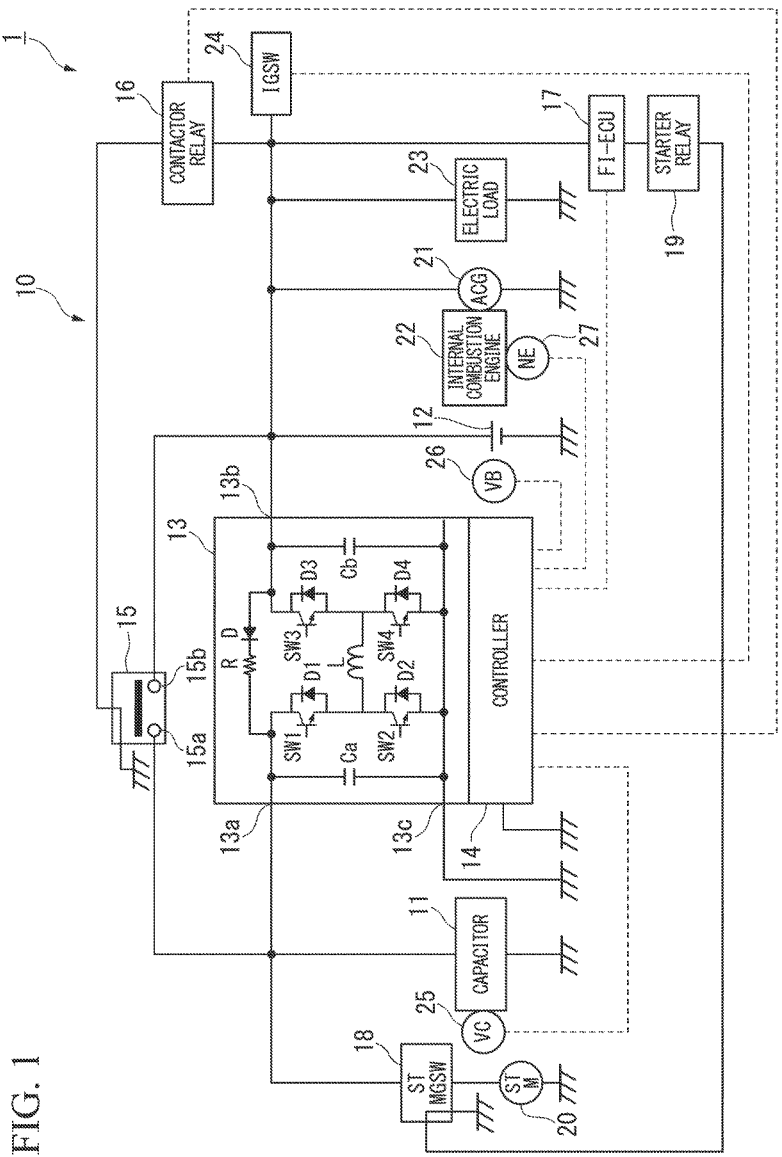
FIG. 1 is a configuration diagram of a vehicle electric power supply apparatus and a vehicle in which the vehicle electric power supply apparatus is mounted according to the embodiment of the present invention.

A vehicle electric power supply apparatus 10 according to the present embodiment is, for example, as shown in FIG. 1, mounted in a vehicle 1. The vehicle electric power supply apparatus 10 includes at least a capacitor 11 (second power source) as a secondary battery, a battery 12 (first power source), a DC-DC converter 13, a controller 14 (control unit), a contactor 15 (switch), and a contactor relay 16 (opening and closing unit).

The vehicle 1 includes the vehicle electric power supply apparatus 10, an FI-ECU 17, a starter magnet switch (STMGSW) 18, a starter relay 19, a starter motor (STM) 20, a generator (ACG) 21, an internal combustion engine 22, an electric load 23, an ignition switch (IGSW) 24 (operation switch), a first voltage sensor 25, a second voltage sensor 26, and a rotation frequency sensor 27.

The capacitor 11 is, for example, an electric double layer capacitor, an electrolytic capacitor, a lithium-ion capacitor, and the like and is connected to the starter magnet switch 18. The capacitor 11 is connected to a first input-output terminal 13a of the DC-DC converter 13 and a first terminal 15a of the contactor 15. The capacitor 11 is configured to be capable of being electrically connected to the battery 12, the contactor relay 16, the FI-ECU 17, the generator 21, the electric load 23, and the ignition switch 24 via the DC-DC converter 13 or the contactor 15.

The battery 12 is, for example, a lead battery of a predetermined voltage (12V or the like) and the like and is connected to the contactor relay 16, the FI-ECU 17, the generator 21, the electric load 23, and the ignition switch 24. The battery 12 is connected to a second input-output terminal 13b of the DC-DC converter 13 and a second terminal 15b of the contactor 15. The battery 12 is configured to be capable of being electrically connected to the capacitor 11 and the starter magnet switch 18 via the DC-DC converter 13 or the contactor 15.

The DC-DC converter 13 is capable of increasing or decreasing voltage bi-directionally between the first input-output terminal 13a and the second input-output terminal 13b by the control of the controller 14. The DC-DC converter 13 charges the capacitor 11 by supplying the generated electric power that is produced by the generator 21 at the time of running of the internal combustion engine 22 or the regenerated electric power that is produced by the generator 21 at the time of braking of the vehicle 1 to the capacitor 11. In addition, the DC-DC converter 13 discharges the capacitor 11 by supplying the electric power stored in the capacitor 11 to at least the battery 12 or the electric load 23.

The DC-DC converter 13 is, for example, an H-bridge step-up/step-down DC-DC converter and includes four first to fourth switching devices (for example, IGBT: Insulated Gate Bipolar mode Transistor) SW1, SW2, SW3, and SW4 that are connected in a bridge form.

The first switching device SW1 and the second switching device SW2 that are paired are connected in series between the first input-output terminal 13a and a ground terminal 13c. Namely, a collector of the first switching device SW1 is connected to the first input-output terminal 13a, an emitter of the first switching device SW1 is connected to a collector of the second switching device SW2, and an emitter of the second switching device SW2 is connected to the ground terminal 13c.

The third switching device SW3 and the fourth switching device SW4 that are paired are connected in series between the second input-output terminal 13b and the ground terminal 13c. Namely, a collector of the third switching device SW3 is connected to the second input-output terminal 13b, an emitter of the third switching device SW3 is connected to a collector of the fourth switching device SW4, and an emitter of the fourth switching device SW4 is connected to the ground terminal 13c.

Each of first to fourth diodes D1 to D4 is connected between the emitter and the collector of each of the switching devices SW1, SW2, SW3, and SW4 such that the direction from the emitter to the collector is the forward direction.

The DC-DC converter 13 includes a reactor L (coil L) that is connected between a connecting point of the first switching device SW 1 and the second switching device SW2 and a connecting point of the third switching device SW3 and the fourth switching device SW4. In addition, the DC-DC converter 13 includes a first capacitor Ca that is connected between the first input-output terminal 13a and the ground terminal 13c, and a second capacitor Cb that is connected between the second input-output terminal 13b and the ground terminal 13c.

The DC-DC converter 13 includes a resistance R and a diode D which are connected in series such that the resistance R and the diode D directly connect the first input-output terminal 13a and the second input-output terminal 13b. The diode D is provided such that the forward direction of the diode is in a direction toward the first input-output terminal 13a from the second input-output terminal 13b.

The DC-DC converter 13 is driven by a signal which is output from the controller 14 and is input to a gate of each of the switching devices SW1, SW2, SW3, and SW4.

The controller 14 controls the bi-directional voltage increasing/decreasing operation of the DC-DC converter 13 and connection and disconnection operations of the contactor 15 by the contactor relay 16. Moreover, the controller 14 controls execution permission and execution inhibition of idle stopping by the FI-ECU 17 and outputs a control command that commands execution permission and execution inhibition of idle stopping to the FI-ECU 17.

The controller 14 is capable of detecting the internal resistance and the capacitance of the capacitor 11 and determining whether or not the internal resistance is a predetermined value or more and is also capable of determining whether or not the capacitor 11 is degraded based on the internal resistance. The controller 14 is connected to the first voltage sensor 25 that detects the output voltage VC of the capacitor 11, a current sensor (not shown in the drawing) that detects the charge current and the discharge current of the capacitor 11, and a temperature sensor (not shown in the drawing) that detects the temperature of the capacitor 11.

The controller 14 is capable of controlling the discharge of the battery 12 and the depth of discharge of the battery 12. The controller 14 is connected to the second voltage sensor 26 that detects the output voltage VB of the battery 12, a current sensor (not shown in the drawing) that detects the charge current and the discharge current of the battery 12, and a temperature sensor (not shown in the drawing) that detects the temperature of the battery 12.

The contactor 15 switches between connection and disconnection of the first terminal 15a and the second terminal 15b of the contactor 15 corresponding to ON and OFF of the contactor relay 16. The controller 14 controls ON and OFF of the contactor relay 16.

Note that, the first terminal 15a of the contactor 15 is connected to the first input-output terminal 13a of the DC-DC converter 13, a positive pole terminal of the capacitor 11, and the starter magnet switch 18. The second terminal 15b of the contactor 15 is connected to the second input-output terminal 13b of the DC-DC converter 13, a positive pole terminal of the battery 12, the generator 21, and the electric load 23. Thereby, in a connecting state, the contactor 15 connects each of the capacitor 11 and the battery 12 in parallel to the starter magnet switch 18 and the starter motor 20 that are connected in series. Note that, a negative pole terminal of the capacitor 11 and a negative pole terminal of the battery 12 are grounded.

The FI-ECU 17 is, for example, an ECU (Electronic Control Unit) that is configured by an electronic circuit such as a CPU (Central Processing Unit) and performs various controls relating to operations of the internal combustion engine 22 such as fuel supply and ignition timing. The FI-ECU 17 controls starting and stopping of the internal combustion engine 22 by a signal of starting request and a signal of stopping request that are output from the ignition switch 24 corresponding to the operation of the driver.

The FI-ECU 17 controls idle stopping of the internal combustion engine 22. In the idle stopping, the internal combustion engine 22 in a running state is automatically and temporarily stopped corresponding to establishment of a predetermined pause condition, and the internal combustion engine 22 in a pause state is automatically restarted corresponding to establishment of a predetermined return condition. The predetermined pause condition is, for example, a condition in which the vehicle speed of the vehicle 1 is zero, an accelerator pedal opening degree is zero, and a brake pedal switch is ON. The predetermined return condition is, for example, a condition in which the brake pedal switch is OFF.

The FI-ECU 17 starts the internal combustion engine 22 by controlling the starter relay 19 to be ON corresponding to the starting request by the signal output from the ignition switch 24 or a return request from the pause state of idle stopping. The FI-ECU 17 controls the power generation operation of the generator (ACG) 21 and arbitrarily changes the generated voltage of the generator 21.

The generator 21 is, for example, an AC generator linked to a crankshaft (not shown in the drawing) of the internal combustion engine 22 via a belt or the like. The generator 21 generates electric power using the power of the internal combustion engine 22 in operation and thereby outputs the generated electric power. When the vehicle 1 is decelerated, is running in a state where fuel supply is stopped, or the like, the generator 21 converts kinetic energy of the vehicle body transmitted from drive wheels (not shown in the drawing) of the vehicle 1 into electric energy (regenerated energy) and outputs the regenerated electric power. Note that, the generator 21 includes a rectifier (not shown in the drawing) that rectifies an AC output by electric power generation and regeneration into a DC output or the like.

The generator 21 is grounded and also is connected to the second input-output terminal 13b of the DC-DC converter 13.

The internal combustion engine 22 is started by the driving force of the starter motor (STM) 20. The starter motor 20 is driven to rotate by the application of voltage from the capacitor 11 or the battery 12 via the starter magnet switch (STMGSW) 18. The starter magnet switch 18 switches between the presence and the absence of electric power supplied to the starter motor 20 corresponding to ON and OFF of the starter relay 19. The FI-ECU 17 controls ON and OFF of the starter relay 19.

The starter motor 20, for example, includes a pinion gear (not shown in the drawing) in a rotating shaft (not shown in the drawing). The internal combustion engine 22, for example, includes a ring gear (not shown in the drawing) that engages with the pinion gear of the starter motor 20 in the crankshaft (not shown in the drawing). Thereby, the starter motor 20 is capable of transmitting the driving force to the internal combustion engine 22 by engaging the pinion gear with the ring gear of the internal combustion engine 22.

The electric load 23 is one of a variety of auxiliary machines. The electric load 23 is grounded and is also connected to the second input-output terminal 13b of the DC-DC converter 13.

The vehicle electric power supply apparatus 10 according to the present embodiment includes the configuration described above. Next, operations of the vehicle electric power supply apparatus 10 will be described.

(Charging and Discharging Operations)

Hereinafter, charging and discharging operations of the capacitor 11 and the battery 12 controlled by the controller 14 will be described.

The controller 14 controls the bi-directional voltage increasing/decreasing operation of the DC-DC converter 13 and the connection and disconnection operations of the contactor 15 by the contactor relay 16 such that the output voltage of the capacitor 11 is matched with a predetermined target voltage corresponding to the driving state of the vehicle 1.

The controller 14 performs nine operation modes M0 to M8 as the charging and discharging operations of the capacitor 11 and the battery 12 corresponding to the driving of the vehicle 1 as shown in Table 1 below.

TABLE 1

| OPERATION MODE | OPERATION CONTENT |
|---|---|
| M0: STOPPING-PERIOD CHARGING MODE | CHARGE CAPACITOR DURING STOPPING PERIOD |
| M1: FIRST-TIME STARTING MODE | IGNITION SWITCH AND STARTER ON |
| M2: I/S PREPARATION CHARGING MODE | CHARGE CAPACITOR IN PREPARATION FOR I/S |
| M3: REGENERATION CHARGING MODE | CHARGE CAPACITOR DURING REGENERATION |
| M4: REGENERATION DISCHARGING MODE | DISCHARGE REGENERATED ELECTRIC POWER AND STOP ACG |
| M5: I/S ELECTRIC POWER SUPPLY (CAPACITOR) MODE | DISCHARGE ELECTRIC POWER FROM CAPACITOR TO ELECTRIC LOAD DURING I/S |
| M6: I/S ELECTRIC POWER SUPPLY (BATT) MODE | SUPPLY ELECTRIC POWER FROM BATTERY TO ELECTRIC LOAD |
| M7: ENG RESTARTING MODE | DISCHARGE CAPACITOR AND RESTART |
| M8: STOPPING-PERIOD MODE | SUPPRESS DEGRADATION OF CAPACITOR |

Figure 2:
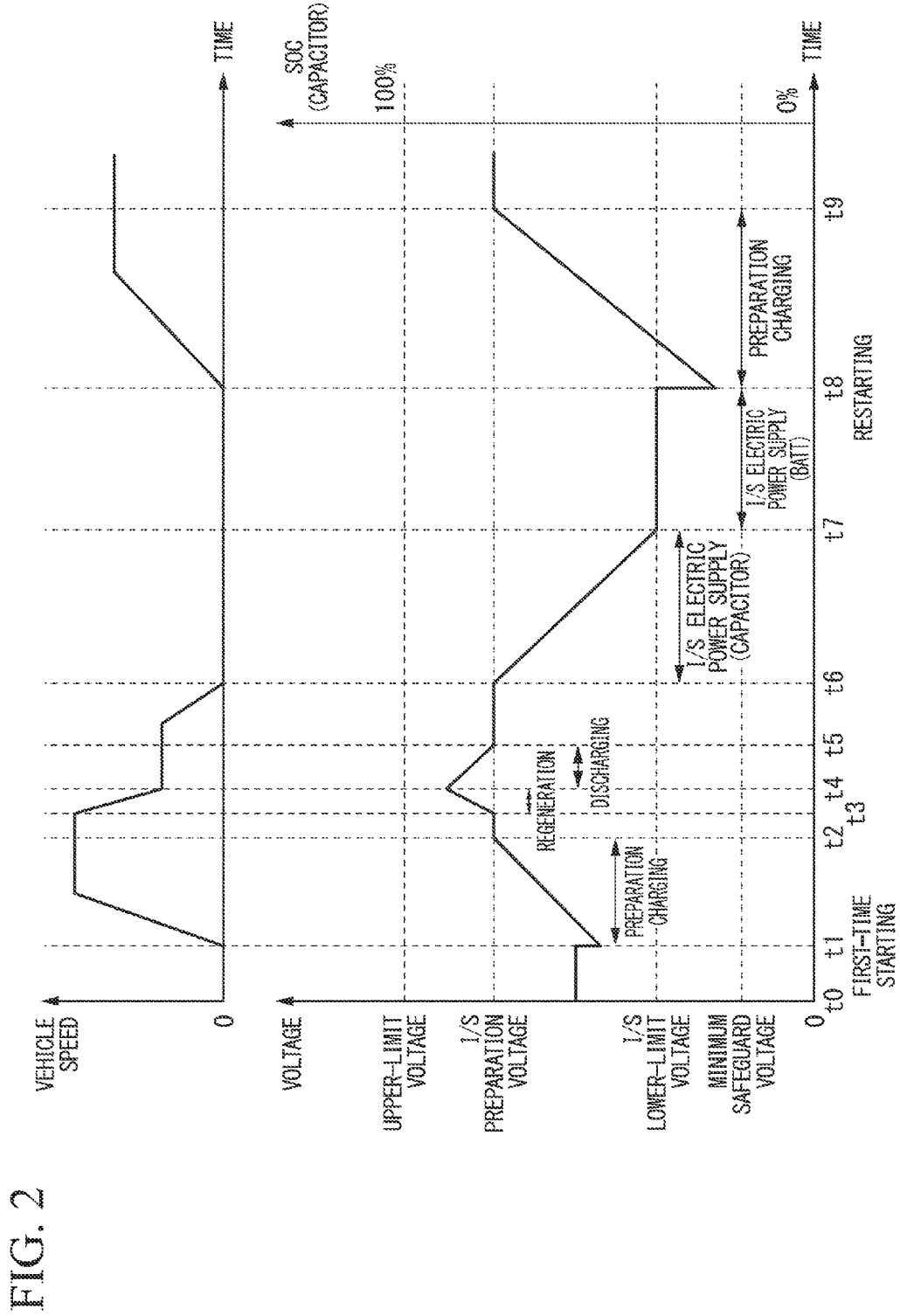
FIG. 2 is a diagram showing an example of the change of the output voltage of a capacitor based on a change of the driving state of the vehicle in which the vehicle electric power supply apparatus is mounted according to the embodiment of the present invention.
Figure 3:
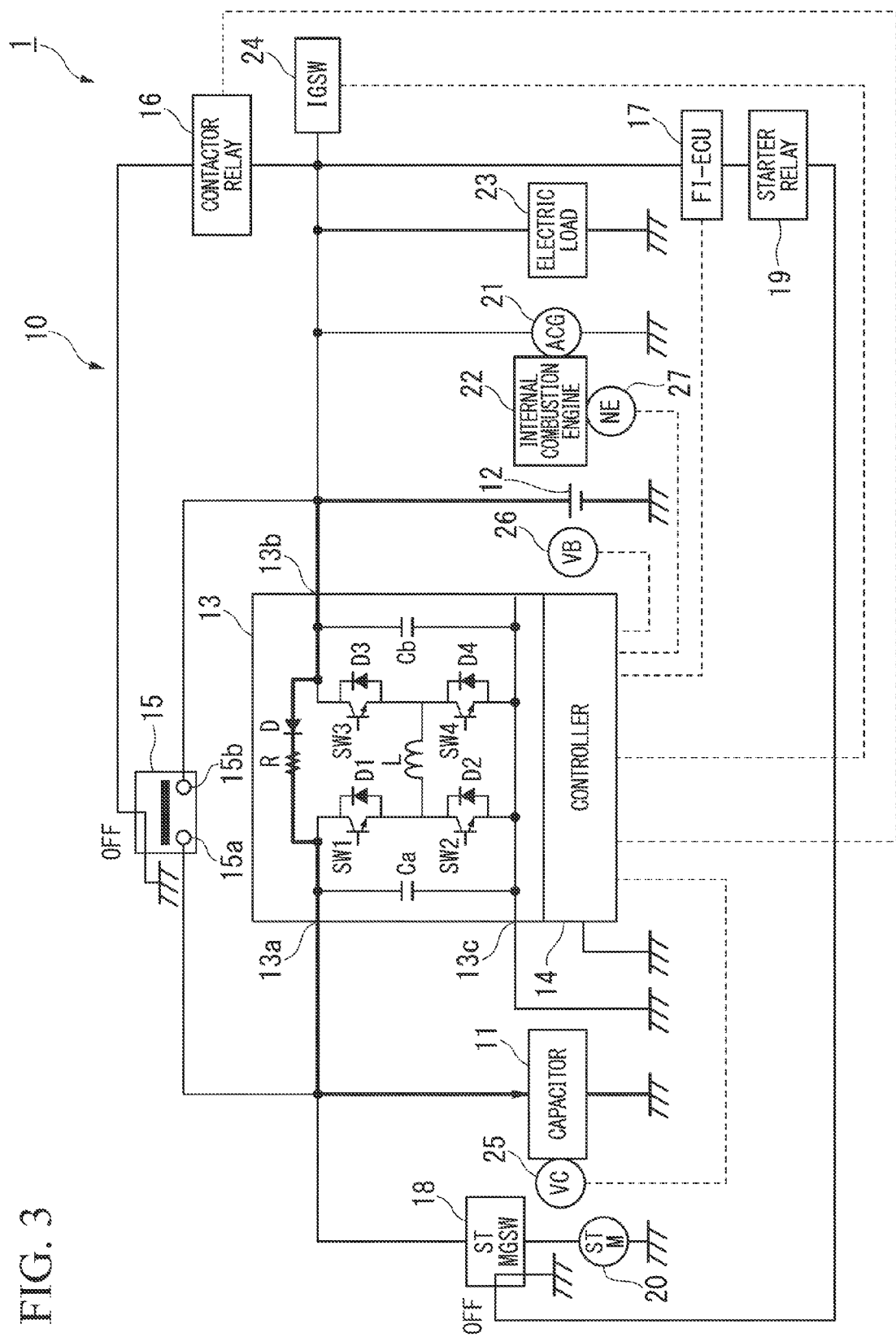
FIG. 3 is a diagram showing a current flow in a stopping-period charging mode performed by a controller of the vehicle electric power supply apparatus according to the embodiment of the present invention.

First, for example, as the period of time t0 to immediately before time t1 shown in FIG. 2, in a state where the ignition switch 24 is OFF, the controller 14 performs the operation of a stopping-period charging mode M0. In the stopping-period charging mode M0, as shown in FIG. 3, the controller 14 charges the capacitor 11 by electric power supply to the capacitor 11 from the battery 12 via the diode D and the resistance R of the DC-DC converter 13. Thereby, the controller 14 prevents the output voltage of the capacitor 11 (for example, corresponding to the voltage of the positive pole terminal with respect to the grounded negative pole terminal) from decreasing excessively.

Next, for example, as time t1 shown in FIG. 2, when the controller 14 receives a starting request requesting of starting the internal combustion engine 22 by the signal output from the ignition switch 24, the controller 14 performs failure detection of the contactor 15 described later and then performs the operation of a first-time starting mode M1.

In the first-time starting mode M1, the controller 14 first sets the contactor 15 to be in a disconnecting state by setting the contactor relay 16 to be OFF, and in the disconnecting state of the contactor 15, the controller 14 sets the starter magnet switch 18 to be in a connecting state by setting the starter relay 19 to be ON. Thereby, the controller 14 drives the starter motor 20 by electric power supply from only the capacitor 11.

Figure 4:
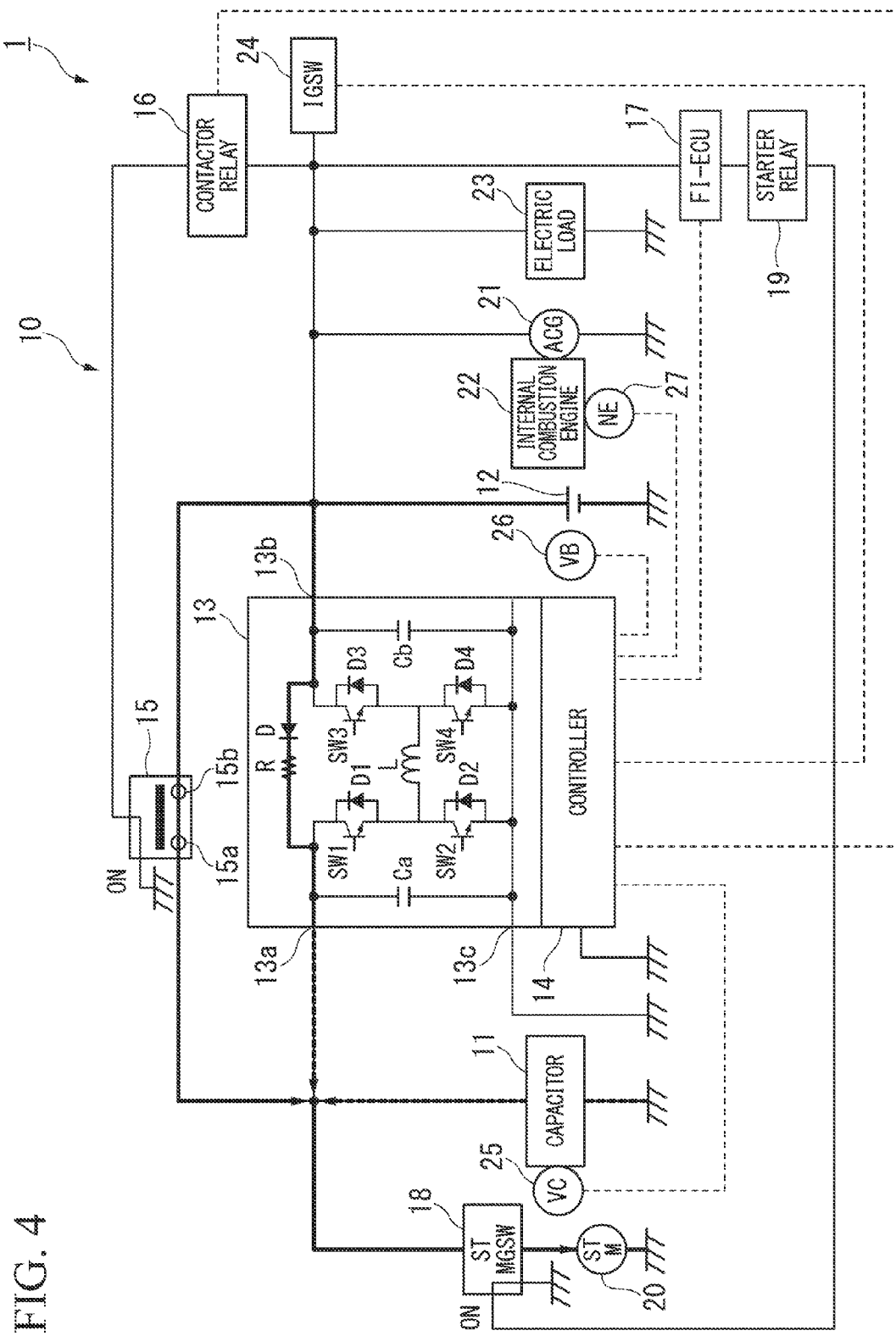
FIG. 4 is a diagram showing a current flow in a first-time starting mode performed by the controller of the vehicle electric power supply apparatus according to the embodiment of the present invention.

At this time, in the case that a predetermined condition described later is established, the controller 14 sets the contactor 15 to be in a connecting state by setting the contactor relay 16 to be ON. Thereby, as shown in FIG. 4, the controller 14 connects each of the capacitor 11 and the battery 12 in parallel to the starter magnet switch 18 and the starter motor 20 that are connected in series. Then, the controller 14 drives the starter motor 20 by electric power supply from the capacitor 11 and the battery 12 and starts the internal combustion engine 22 using the driving force of the starter motor 20.

Note that, in the first-time starting mode M1, for example, as time t1 shown in FIG. 2, the output voltage and the remaining capacity SOC of the capacitor 11 decreases due to electric power supply from the capacitor 11 to the starter motor 20.

Figure 5:
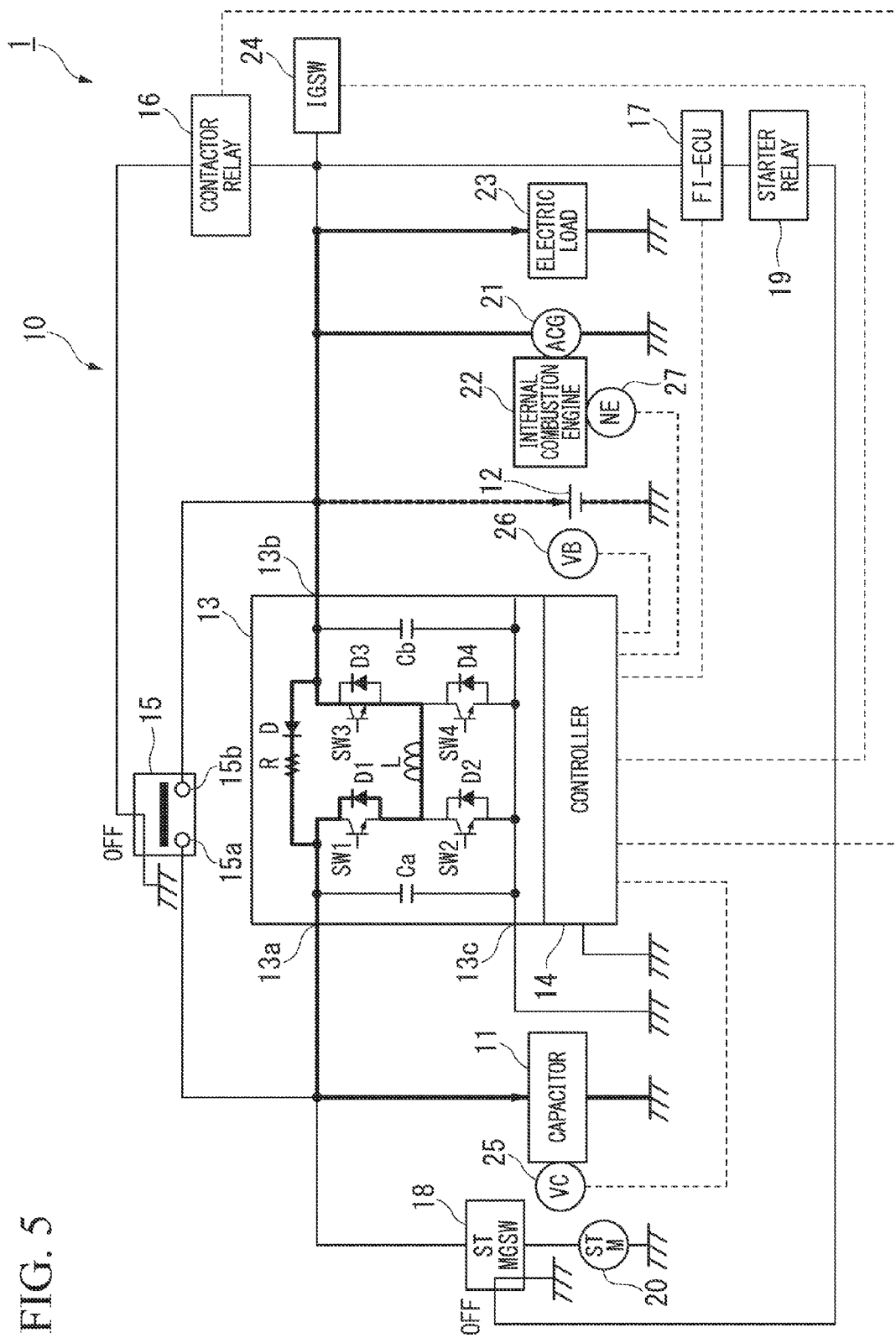
FIG. 5 is a diagram showing a current flow in an I/S preparation charging mode performed by the controller of the vehicle electric power supply apparatus according to the embodiment of the present invention.

Next, for example, as the period of time t1 to time t2 shown in FIG. 2, in a state where the vehicle 1 is in a running state other than deceleration and where there is no execution command of idle stopping, the controller 14 performs the operation of an I/S preparation charging mode M2. In the I/S preparation charging mode M2, as shown in FIG. 5, the controller 14 charges the capacitor 11 by electric power supply to the capacitor 11 from the generator 21 via the DC-DC converter 13 using the generated electric power output from the generator 21 that generates electric power by the power of the internal combustion engine 22 in a running state. Moreover, electric power is supplied from the generator 21 to the electric load 23 and also is supplied from the generator 21 to the battery 12 corresponding to the state of the battery 12.

In more detail, the controller 14 sets the contactor 15 to be in a disconnecting state by setting the contactor relay 16 to be OFF and sets the starter magnet switch 18 to be in a disconnecting state by setting the starter relay 19 to be OFF. The controller 14 applies a current to the diode D and the resistance R and also applies a current to the third switching device SW3 in an ON state, the reactor L (coil L), and the first diode D1 in between the second input-output terminal 13b and the first input-output terminal 13a of the DC-DC converter 13. The controller 14 charges the capacitor 11 at least until the output voltage of the capacitor 11 reaches a predetermined I/S preparation voltage such that electric power required to restart the internal combustion engine 22 is stored in the capacitor 11 in preparation for execution of idle stopping.

Note that, the predetermined I/S preparation voltage is, for example, an output voltage corresponding to the remaining capacity SOC of the capacitor 11 capable of performing electric power supply required for the electric load 23 and the like in the pause state of the internal combustion engine 22 over a predetermined period of time due to idle stopping.

Figure 6:
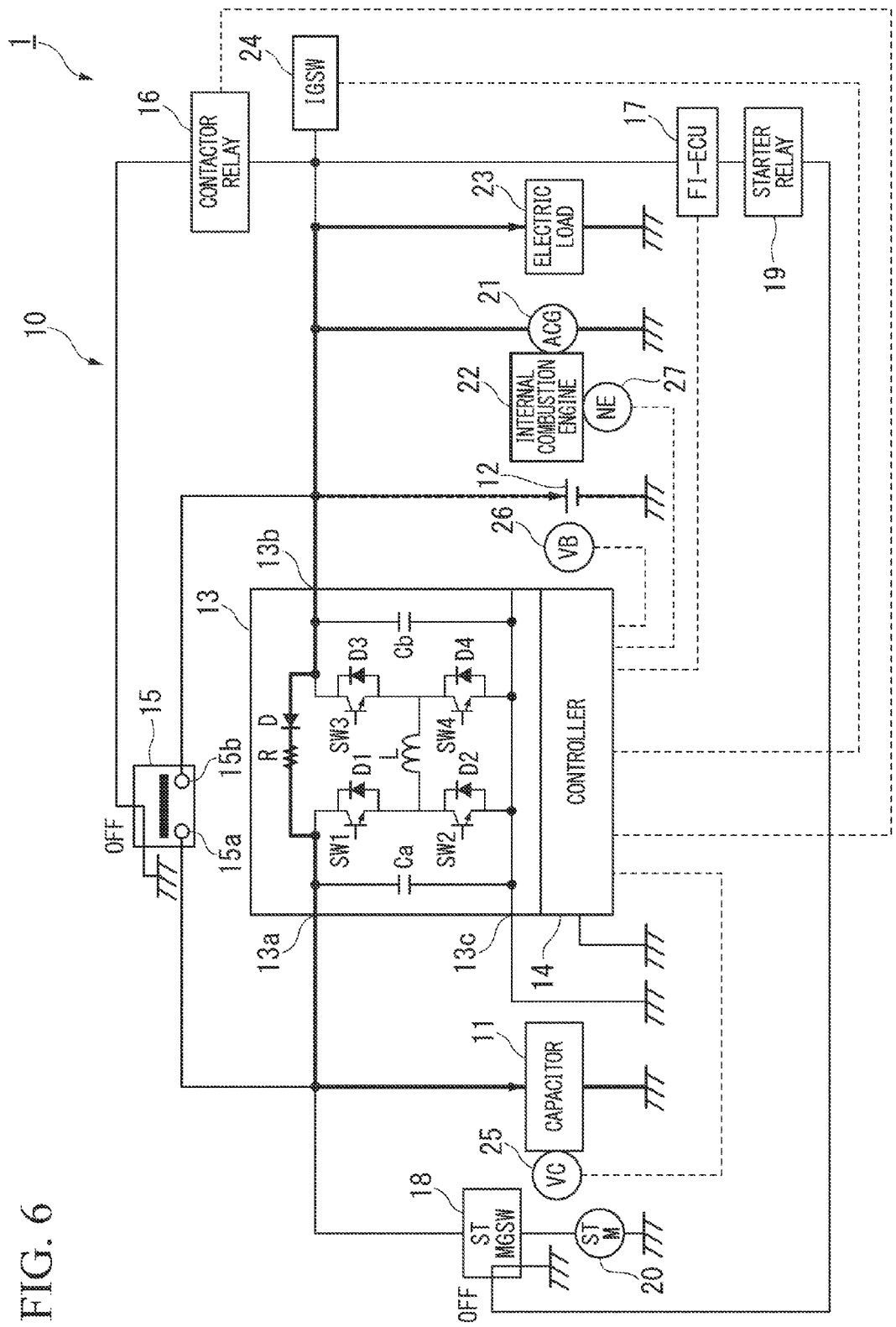
FIG. 6 is a diagram showing a current flow when the output voltage of the capacitor reaches a predetermined I/S preparation voltage in the I/S preparation charging mode performed by the controller of the vehicle electric power supply apparatus according to the embodiment of the present invention.

Moreover, for example, as the period of time t2 to time t3 shown in FIG. 2, in a state where the vehicle 1 is in a running state other than deceleration, where there is no execution command of idle stopping, and where the output voltage of the capacitor 11 has reached the predetermined I/S preparation voltage, the controller 14 continues to perform the operation of the I/S preparation charging mode M2. In this case, as shown in FIG. 6, the controller 14 switches the third switching device SW3 from the ON state to the OFF state and applies a current to the diode D and the resistance R in between the second input-output terminal 13b and the first input-output terminal 13a of the DC-DC converter 13. Thereby, the controller 14 maintains the output voltage of the capacitor 11 at the predetermined I/S preparation voltage.

Figure 7:
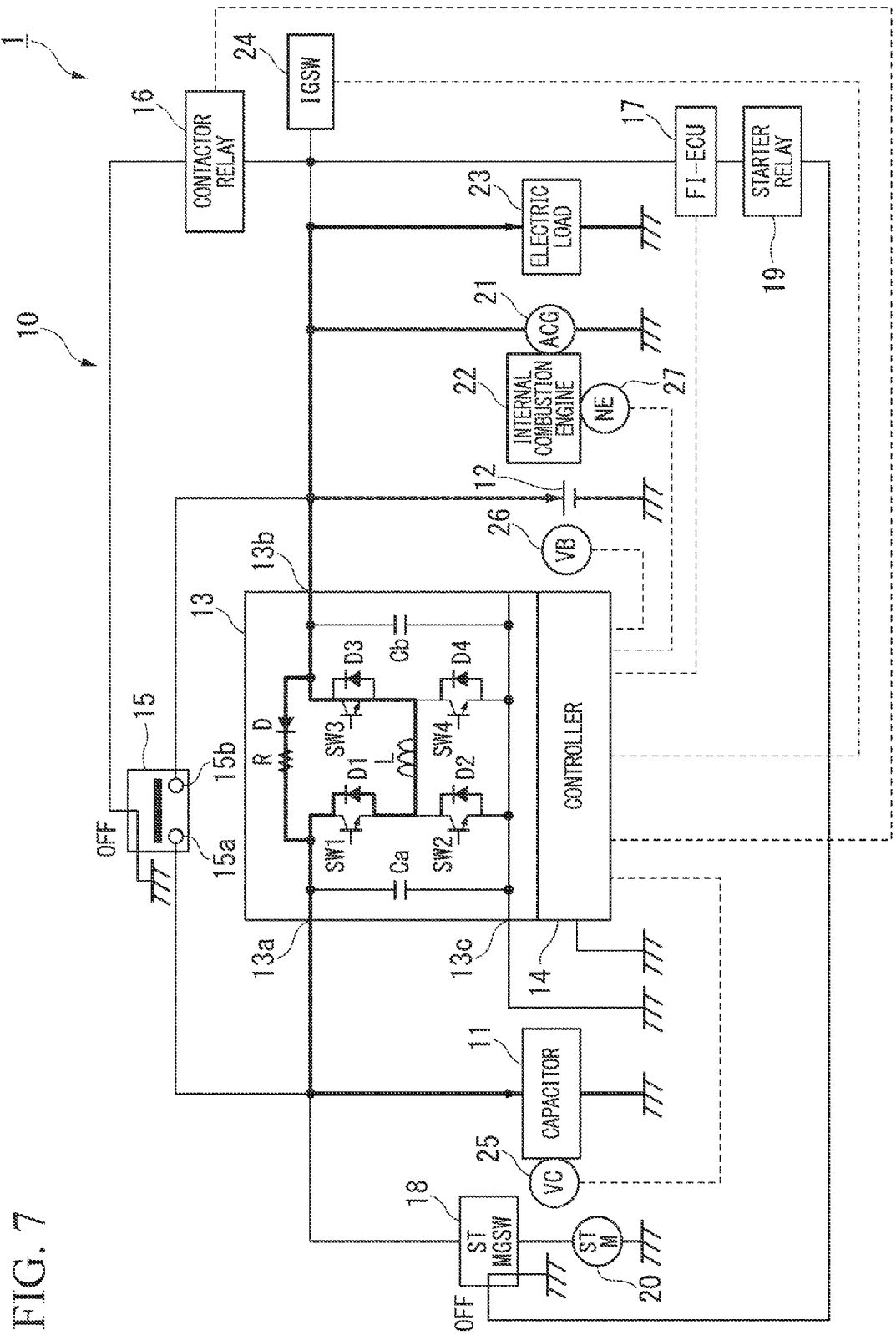
FIG. 7 is a diagram showing a current flow in a regeneration charging mode performed by the controller of the vehicle electric power supply apparatus according to the embodiment of the present invention.

Next, for example, as the period of time t3 to time t4 shown in FIG. 2, in a state where fuel supply is stopped such as when the vehicle 1 is decelerated, the controller 14 performs the operation of a regeneration charging mode M3. In the regeneration charging mode M3, as shown in FIG. 7, the controller 14 charges the capacitor 11 by electric power supply to the capacitor 11 from the generator 21 via the DC-DC converter 13 using the regenerated electric power output from the generator 21 when the vehicle 1 is decelerated or the like. Moreover, electric power is supplied from the generator 21 to the electric load 23 and also is supplied from the generator 21 to the battery 12 corresponding to the state of the battery 12. The controller 14 converts kinetic energy of the vehicle body transmitted from drive wheels (not shown in the drawing) of the vehicle 1 into electric energy (regenerated energy) by the generator 21 and generates the regenerated electric power.

In more detail, the controller 14 sets the contactor 15 to be in a disconnecting state by setting the contactor relay 16 to be OFF and sets the starter magnet switch 18 to be in a disconnecting state by setting the starter relay 19 to be OFF. The controller 14 applies a current to the diode D and the resistance R and also applies a current to the third switching device SW3 in an ON state, the reactor L (coil L), and the first diode D1 in between the second input-output terminal 13b and the first input-output terminal 13a of the DC-DC converter 13. The controller 14 charges the capacitor 11 at least in a range in which the output voltage of the capacitor 11 is a predetermined upper-limit voltage or less.

Note that, the predetermined upper-limit voltage is greater than the I/S preparation voltage and is, for example, an output voltage corresponding to a full charge state (namely, remaining capacity SOC=100%).

Figure 8:
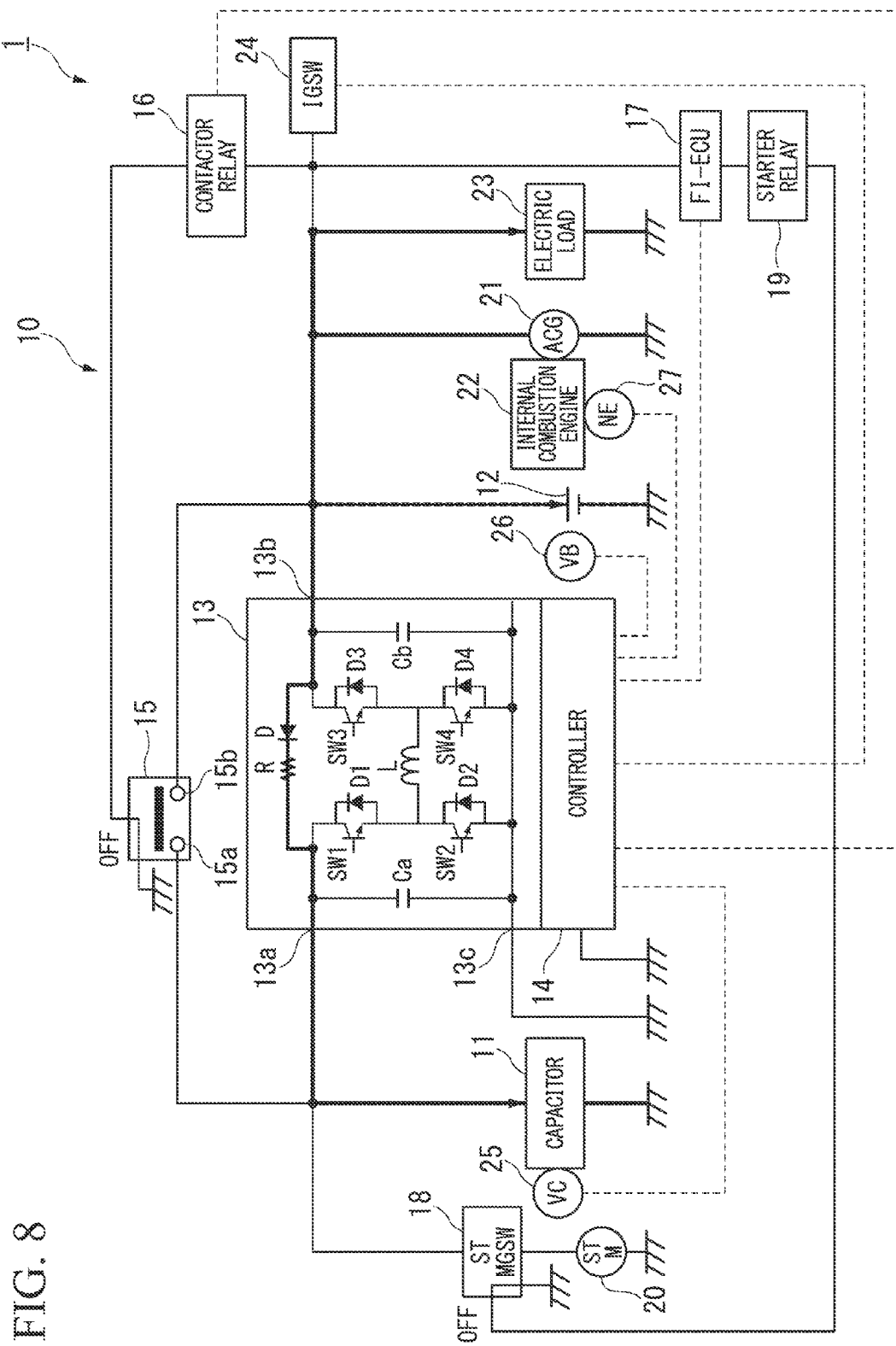
FIG. 8 is a diagram showing a current flow when the output voltage of the capacitor reaches a predetermined upper-limit voltage in the regeneration charging mode performed by the controller of the vehicle electric power supply apparatus according to the embodiment of the present invention.

Moreover, in a state where fuel supply is stopped such as when the vehicle 1 is decelerated and where the output voltage of the capacitor 11 has reached the predetermined upper-limit voltage, the controller 14 continues to perform the operation of the regeneration charging mode M3. In this case, as shown in FIG. 8, the controller 14 switches the third switching device SW3 from the ON state to the OFF state and applies a current to the diode D and the resistance R in between the second input-output terminal 13b and the first input-output terminal 13a of the DC-DC converter 13. Thereby, the controller 14 maintains the output voltage of the capacitor 11 at the predetermined upper-limit voltage.

Figure 9:
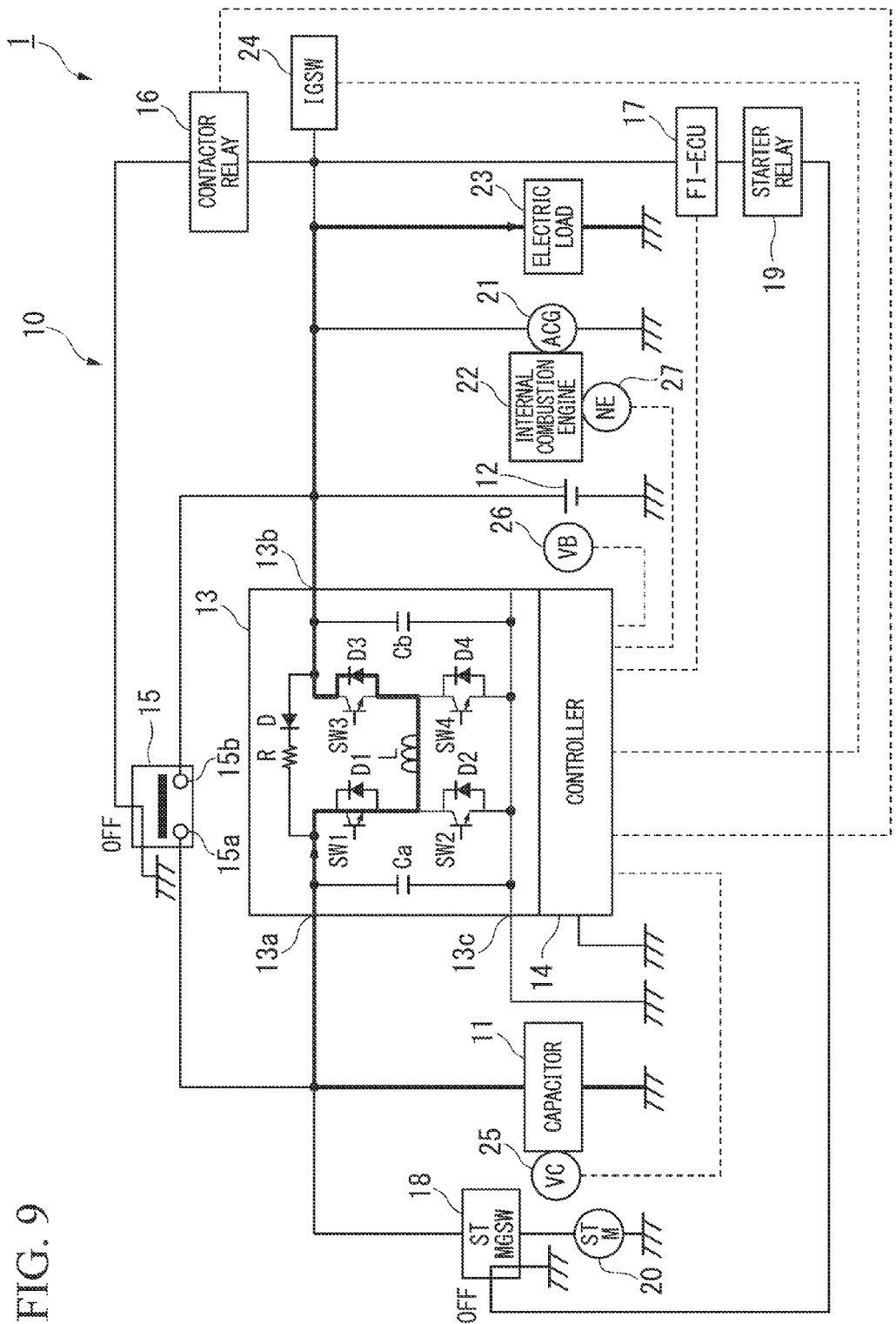
FIG. 9 is a diagram showing a current flow in a regeneration discharging mode performed by the controller of the vehicle electric power supply apparatus according to the embodiment of the present invention.

Next, for example, as the period of time t4 to time t5 shown in FIG. 2, in a state where the vehicle 1 is running at a constant speed or the like and where there is no execution command of idle stopping, the controller 14 performs the operation of a regeneration discharging mode M4. In the regeneration discharging mode M4, as shown in FIG. 9, the controller 14 discharges the capacitor 11 by electric power supply from the capacitor 11 to the electric load 23 via the DC-DC converter 13 using the regenerated electric power stored in the capacitor 11 exceeding the predetermined I/S preparation voltage.

In more detail, the controller 14 sets the contactor 15 to be in a disconnecting state by setting the contactor relay 16 to be OFF and sets the starter magnet switch 18 to be in a disconnecting state by setting the starter relay 19 to be OFF. The controller 14 applies a current to the first switching device SW1 in an ON state, the reactor L (coil L), and the third diode D3 in between the first input-output terminal 13a and the second input-output terminal 13b of the DC-DC converter 13. The controller 14 discharges the capacitor 11 at least until the output voltage of the capacitor 11 reaches the predetermined I/S preparation voltage. At this time, the controller 14 stops electric power generation and regeneration of the generator 21 or sets the output voltage of the generator 21 to a voltage lower than a specified voltage at normal operations.

Figure 10:
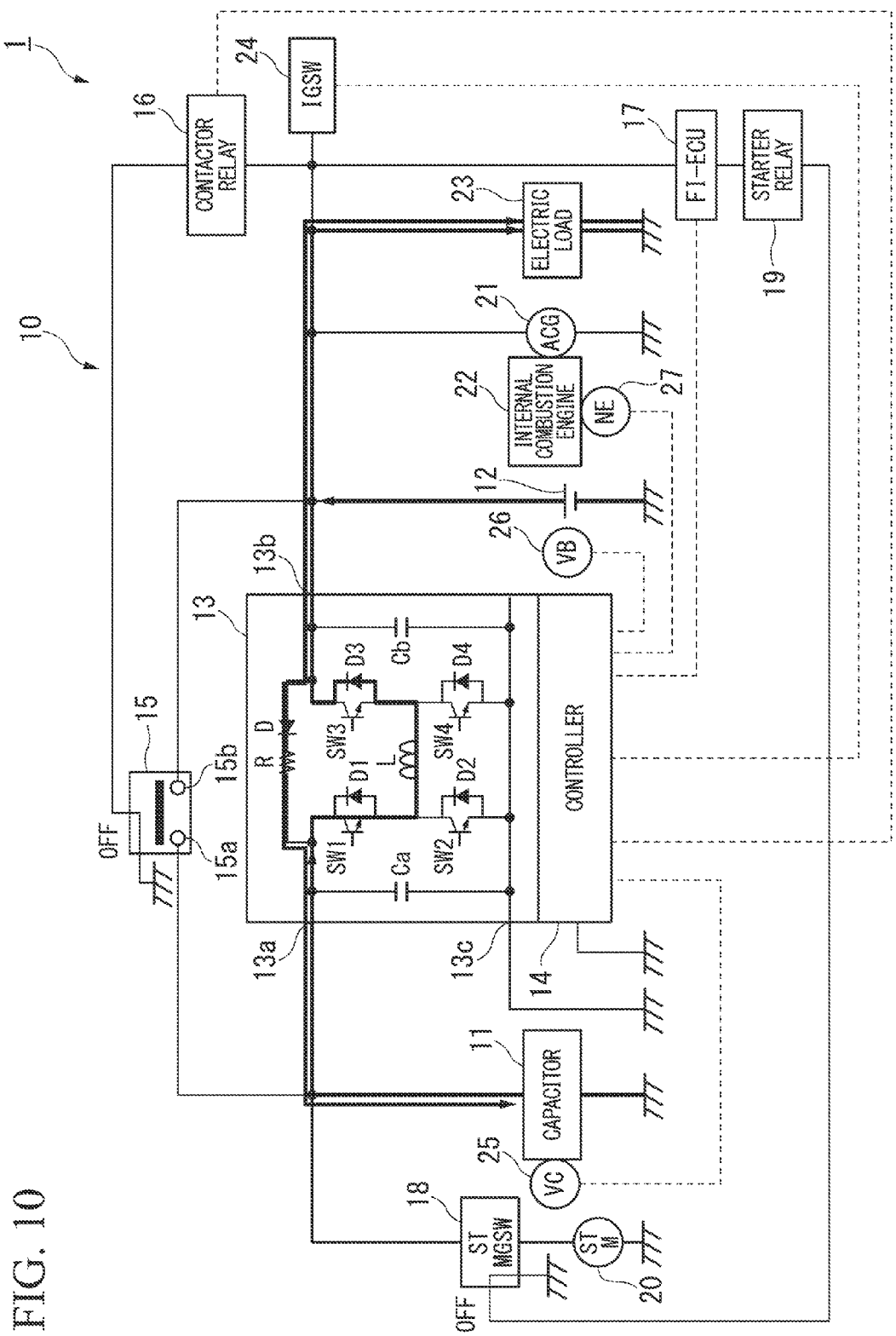
FIG. 10 is a diagram showing a current flow in an I/S electric power supply (capacitor) mode performed by the controller of the vehicle electric power supply apparatus according to the embodiment of the present invention.

Next, for example, as the period of time t6 to time t7 shown in FIG. 2, in a state of stopping of the vehicle 1 (a state where the vehicle speed is zero) and executing idle stopping, the controller 14 performs the operation of an I/S electric power supply (capacitor) mode M5. In the I/S electric power supply (capacitor) mode M5, as shown in FIG. 10, in the pause state of the internal combustion engine 22 due to idle stopping of the vehicle 1, the controller 14 discharges the capacitor 11 by electric power supply from the capacitor 11 to the electric load 23 via the DC-DC converter 13 using the electric power stored in the capacitor 11 exceeding a predetermined I/S lower-limit voltage.

In more detail, the controller 14 sets the contactor 15 to be in a disconnecting state by setting the contactor relay 16 to be OFF and sets the starter magnet switch 18 to be in a disconnecting state by setting the starter relay 19 to be OFF. The controller 14 applies a current to the first switching device SW1 in an ON state, the reactor L (coil L), and the third diode D3 between the first input-output terminal 13a and the second input-output terminal 13b of the DC-DC converter 13. The controller 14 discharges the capacitor 11 at least until the output voltage of the capacitor 11 reaches the predetermined I/S lower-limit voltage while securing electric power required to restart the internal combustion engine 22 corresponding to a return request.

Note that, the predetermined I/S lower-limit voltage is smaller than the I/S preparation voltage and is, for example, an output voltage corresponding to a remaining capacity SOC capable of performing appropriate electric power supply required to restart the internal combustion engine 22 in the pause state by the driving force of the starter motor 20. In addition, appropriate electric power supply by the capacitor 11 means that the capacitor 11 is discharged such that the output voltage of the capacitor 11 is not decreased to less than a predetermined minimum safeguard voltage. Therefore, as shown in FIG. 10, the controller 14 is capable of charging the capacitor 11 by electric power supply to the capacitor 11 from the battery 12 via the diode D and the resistance R of the DC-DC converter 13 in addition to electric power supply to the electric load 23 from the battery 12. Thereby, the controller 14 prevents the output voltage of the capacitor 11 from decreasing to a voltage less than the predetermined minimum safeguard voltage. Note that, the minimum safeguard voltage is smaller than the I/S lower-limit voltage and is, for example, an output voltage required to maintain the capacitor 11 in an adequate state.

Figure 11:
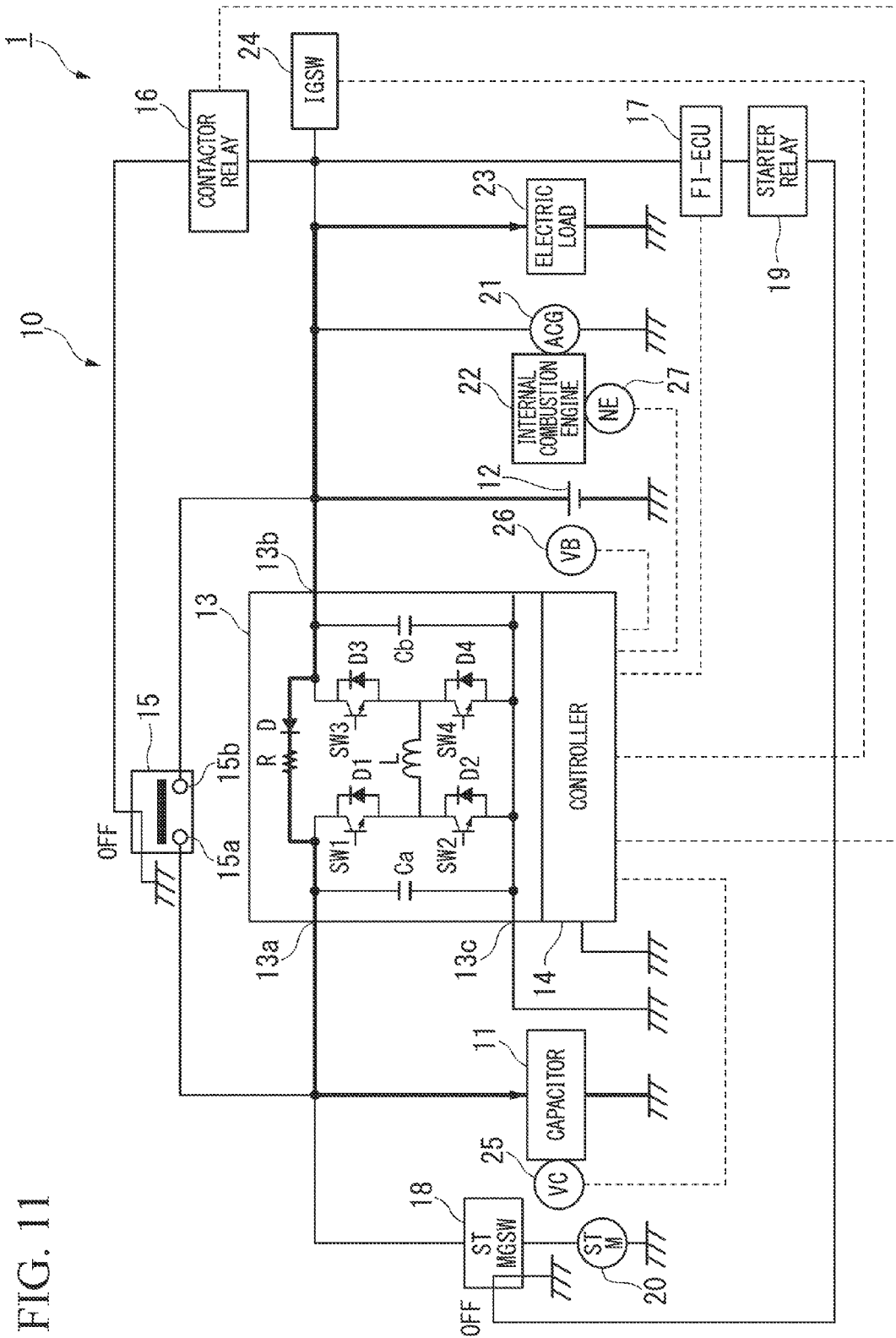
FIG. 11 is a diagram showing a current flow in an I/S electric power supply (BATT) mode performed by the controller of the vehicle electric power supply apparatus according to the embodiment of the present invention.

Next, for example, as the period of time t7 to immediately before time t8 shown in FIG. 2, in a state of stopping of the vehicle 1 (a state where the vehicle speed is zero) and idle stopping and where the output voltage of the capacitor 11 has reached the predetermined I/S lower-limit voltage, the controller 14 performs the operation of an I/S electric power supply (BATT) mode M6. In the I/S electric power supply (BATT) mode M6, as shown in FIG. 11, in the pause state of the internal combustion engine 22 due to idle stopping of the vehicle 1, the controller 14 charges the capacitor 11 by electric power supply from the battery 12 to the capacitor 11 via the DC-DC converter 13 using electric power stored in the battery 12. Moreover, electric power is supplied from the battery 12 to the electric load 23.

In more detail, the controller 14 sets the contactor 15 to be in a disconnecting state by setting the contactor relay 16 to be OFF and sets the starter magnet switch 18 to be in a disconnecting state by setting the starter relay 19 to be OFF. The controller 14 switches the first switching device SW1 from the ON state to the OFF state and applies a current to the diode D and the resistance R in between the second input-output terminal 13b and the first input-output terminal 13a of the DC-DC converter 13. Thereby, the controller 14 maintains the output voltage of the capacitor 11 at the predetermined I/S lower-limit voltage and inhibits discharging from the capacitor 11 in which the minimum electric power required to restart the internal combustion engine 22 corresponding to a return request is secured.

Figure 12:
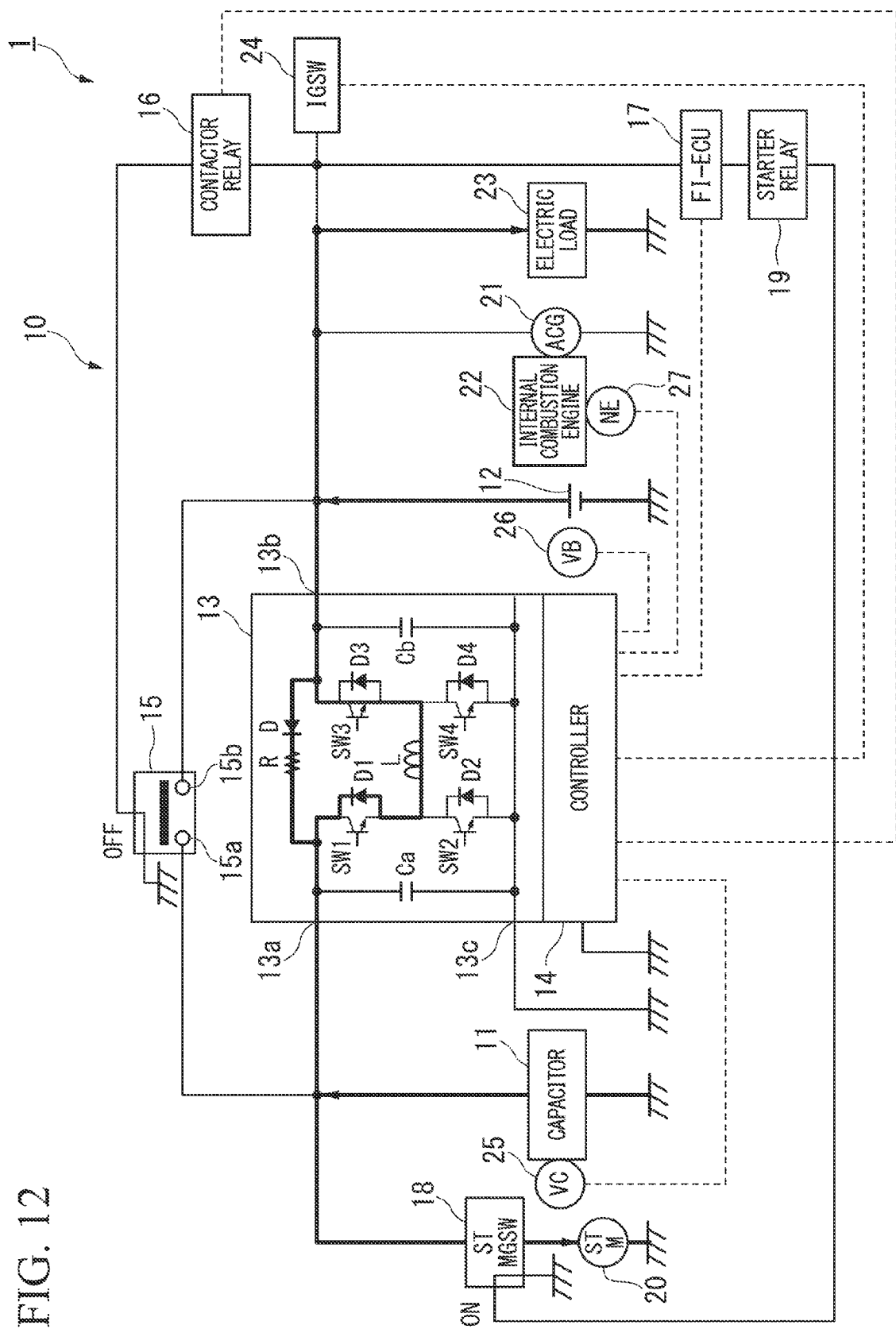
FIG. 12 is a diagram showing a current flow in an ENG restarting mode performed by the controller of the vehicle electric power supply apparatus according to the embodiment of the present invention.

Next, for example, as time t8 shown in FIG. 2, when the controller 14 receives a return request that requests to restart the internal combustion engine 22 in the pause state due to idle stopping, the controller 14 performs the operation of an ENG restarting mode M7. In the ENG restarting mode M7, as shown in FIG. 12, the controller 14 sets the contactor 15 to be in a disconnecting state by setting the contactor relay 16 to be OFF and sets the starter magnet switch 18 to be in a connecting state by setting the starter relay 19 to be ON. The controller 14 drives the starter motor 20 by electric power supply from only the capacitor 11 connected in parallel to the starter magnet switch 18 and the starter motor 20 that are connected in series and restarts the internal combustion engine 22 by the driving force of the starter motor 20.

The controller 14 supplies electric power from the battery 12 to the electric load 23 and also charges the capacitor 11 by electric power supply from the battery 12 to the capacitor 11 via the DC-DC converter 13. Thereby, the controller 14 prevents the output voltage of the capacitor 11 from decreasing to less than the predetermined minimum safeguard voltage if the output voltage and the remaining capacity SOC of the capacitor 11 decreases due to electric power supplied from the capacitor 11 to the starter motor 20.

Figure 13:
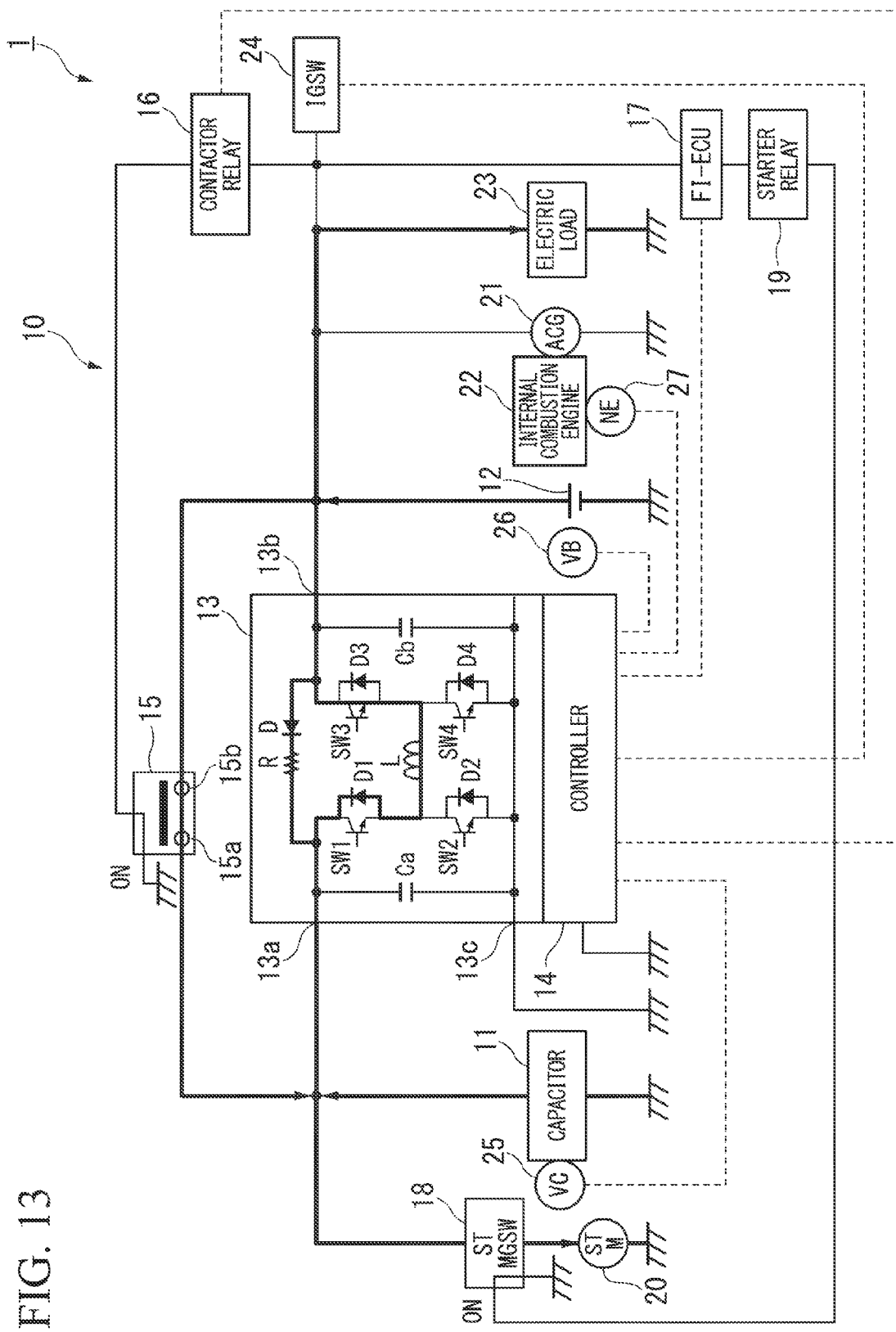
FIG. 13 is a diagram showing a current flow when a contactor is set to a connecting state in the ENG restarting mode performed by the controller of the vehicle electric power supply apparatus according to the embodiment of the present invention.

Note that, for example, as time t8 shown in FIG. 2, in the case that it is impossible to restart the internal combustion engine 22 by electric power supply from only the capacitor 11 to the starter motor 20 when the operation of the ENG restarting mode M7 is performed, as shown in FIG. 13, the controller 14 sets the contactor 15 to be in a connecting state by setting the contactor relay 16 to be ON. Thereby, the controller 14 drives the starter motor 20 by electric power supply from the capacitor 11 and the battery 12 and restarts the internal combustion engine 22 by the driving force of the starter motor 20.

The controller 14 determines that it is impossible to restart the internal combustion engine 22 in the case that the rotation frequency of the internal combustion engine 22 (engine rotation frequency NE) detected by the rotation frequency sensor 27 is a predetermined rotation frequency or less after a predetermined length of time elapses since beginning to restart the internal combustion engine 22, in the case that a signal indicating a starting error of the internal combustion engine 22 output from the FI-ECU 17 is received, or the like.

The controller 14 inhibits the next execution of idle stopping in the case that the internal combustion engine 22 is restarted by setting the contactor relay 16 to be ON. Note that, the determination basis of inhibition of the next execution of idle stopping is not limited only to whether or not the internal combustion engine 22 is restarted by setting the contactor relay 16 to be ON. The controller 14 may calculate the total number of times of the restarting and inhibit the next execution of idle stopping in the case that the total number of times is a predetermined number of times or more (for example, once or more). In addition, the controller 14 may inhibit the next execution of idle stopping in the case that the output voltage of the battery 12 decreases to a predetermined lower-limit voltage or less when the internal combustion engine 22 is restarted by setting the contactor relay 16 to be ON.

Next, for example, as the period of time t8 to time t9 shown in FIG. 2, in a state where the vehicle 1 is in a running state other than deceleration and where there is no execution command of idle stopping, the controller 14 performs the operation of the I/S preparation charging mode M2 described above.

Figure 14:
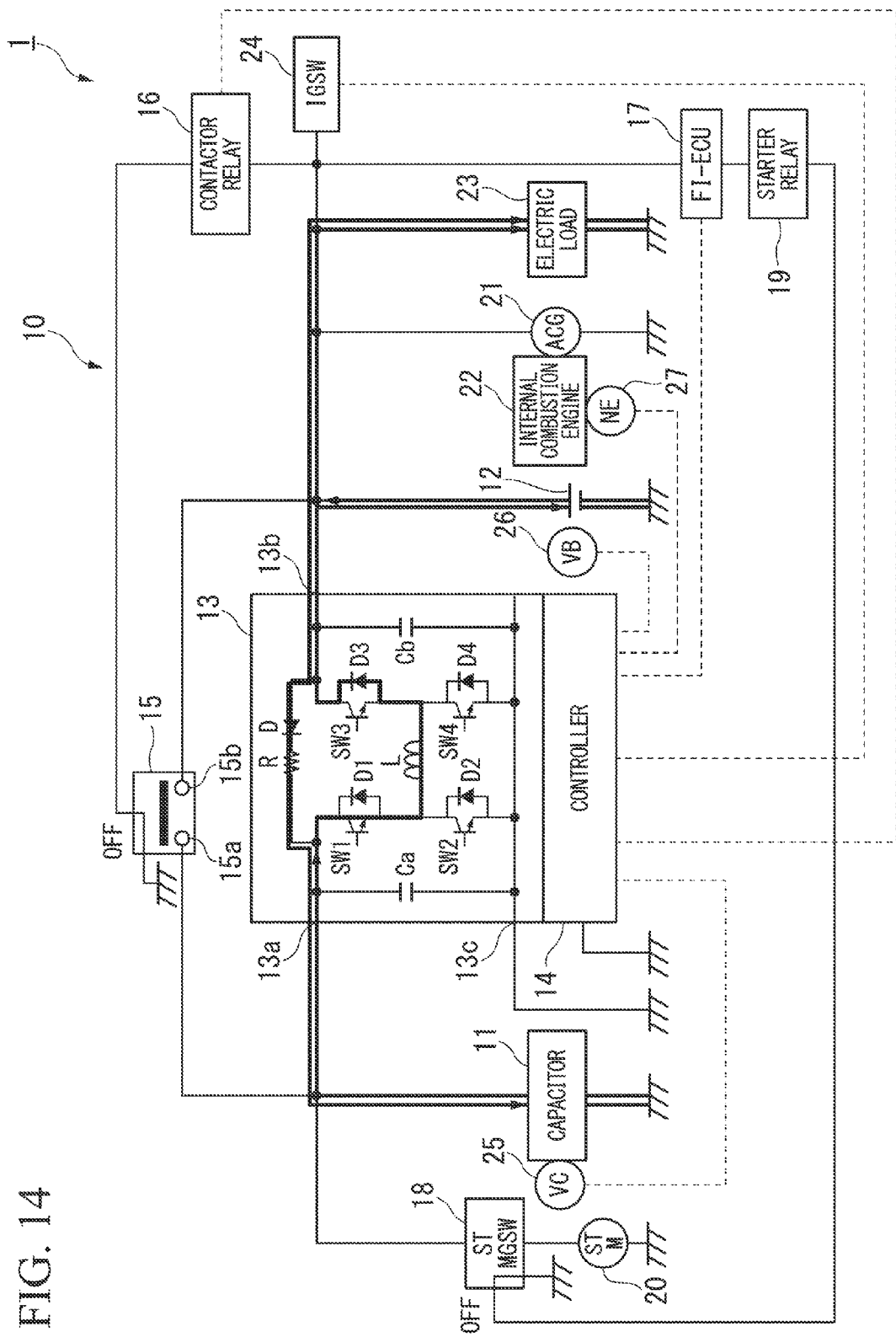
FIG. 14 is a diagram showing a current flow in a vehicle stopping-period mode performed by the controller of the vehicle electric power supply apparatus according to the embodiment of the present invention.

Next, the controller 14 performs the operation of a vehicle 1 stopping-period mode M8 over a predetermined length of time since the ignition switch 24 is switched from ON to OFF. In the vehicle 1 stopping-period mode M8, as shown in FIG. 14, the controller 14 sets the contactor 15 to be in a disconnecting state by setting the contactor relay 16 to be OFF and sets the starter magnet switch 18 to be in a disconnecting state by setting the starter relay 19 to be OFF. The controller 14 discharges the capacitor 11 by electric power supply from the capacitor 11 to the battery 12 and the electric load 23 via the DC-DC converter 13 and suppresses degradation of the capacitor 11 in the stopping period of the vehicle 1. In more detail, the controller 14 applies a current to the first switching device SW1 in an ON state, the reactor L (coil L), and the third diode D3 in between the first input-output terminal 13a and the second input-output terminal 13b of the DC-DC converter 13.

Note that, in order to prevent the output voltage of the capacitor 11 in the stopping period of the vehicle 1 from decreasing to less than the predetermined minimum safeguard voltage, the controller 14 charges the capacitor 11 by electric power supply from the battery 12 to the capacitor 11 via the diode D and the resistance R of the DC-DC converter 13 in addition to electric power supply from the battery 12 to the electric load 23.

In the case that the ignition switch 24 is turned off and the vehicle 1 becomes in a stopping state, the controller 14 removes inhibition of the next execution of idle stopping that requires restarting of the internal combustion engine 22 by driving the starter motor 20 (namely, inhibition of driving the starter motor 20).

Figure 15:
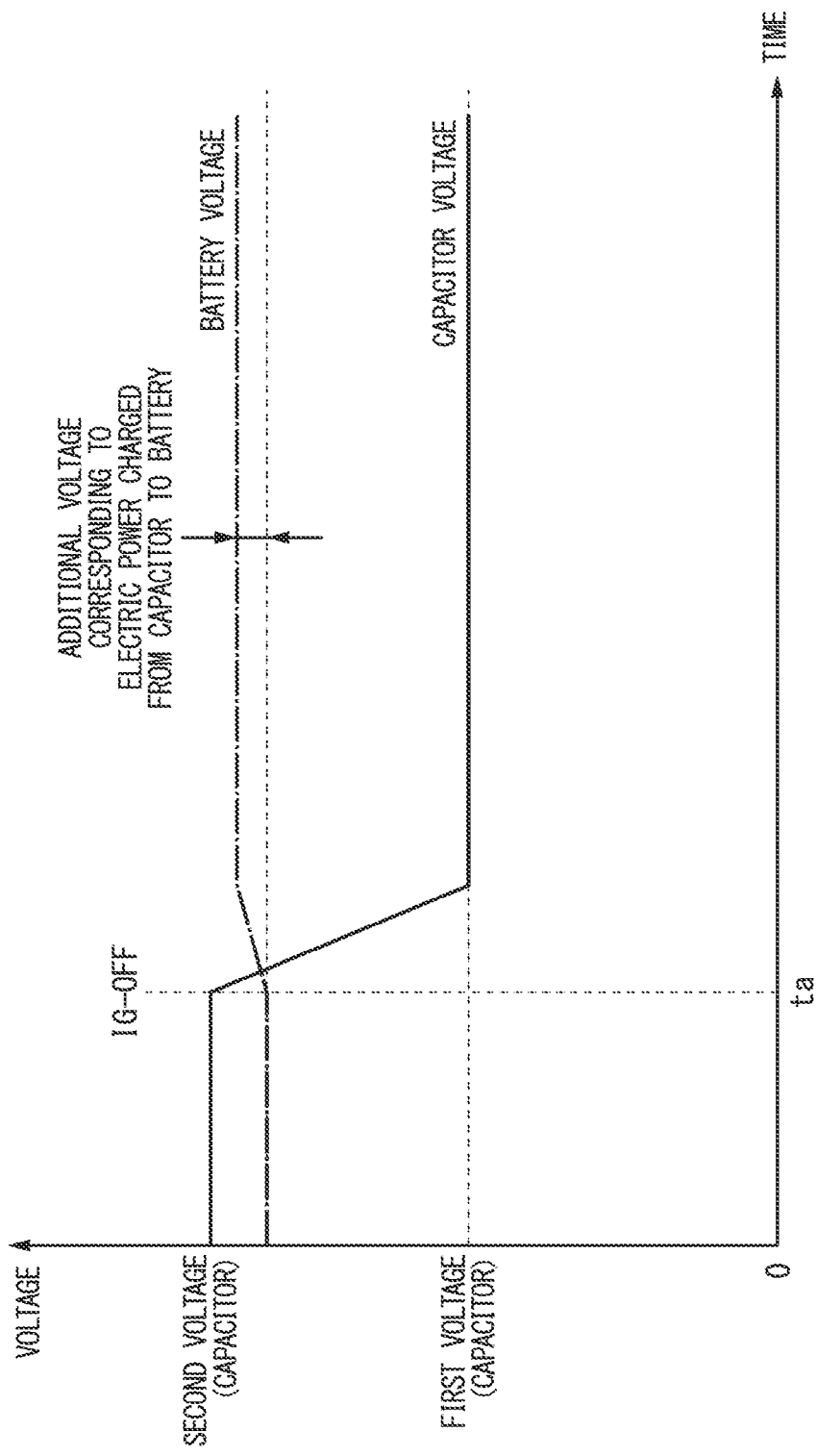
FIG. 15 is a diagram showing an example of the correspondence relationship between the output voltage of a battery (battery voltage) and the output voltage of the capacitor (capacitor voltage) before and after an ignition switch is switched from ON to OFF in the vehicle electric power supply apparatus according to the embodiment of the present invention.

In the case that the ignition switch 24 is turned off and the vehicle 1 becomes in a stopping state, the controller 14 sets the contactor 15 to be in a disconnecting state. Then, for example, as the time after time to shown in FIG. 15, the controller 14 discharges the capacitor 11 and charges the battery 12 by electric power supply from the capacitor 11 to the battery 12 via the DC-DC converter 13 until the output voltage of the capacitor 11 reaches a predetermined first voltage. Note that, the first voltage is smaller than a second voltage that is an output voltage of the capacitor 11 which is set when the internal combustion engine 22 is running, namely when the ignition switch 24 is set to ON. Thereby, the output voltage of the battery 12 increases by an additional voltage corresponding to electric power charged from the capacitor 11 to the battery 12. On the other hand, the output voltage of the capacitor 11 decreases to the first voltage from the second voltage.

The capacitor 11 has characteristics that the self-discharge amount after discharging is smaller than the self-discharge amount after charging in the case that the output voltage after discharging is the same as the output voltage after charging. Accordingly, it is possible to reduce the self-discharge amount by decreasing the output voltage of the capacitor 11 from the second voltage to the first voltage by discharging the capacitor 11 when the ignition switch 24 is OFF, compared to, for example, a case where the output voltage of the capacitor 11 is increased to the first voltage by charging.

In addition, the capacitor 11 has characteristics that the self-discharge amount changes to a decreasing tendency according to the decrease of the output voltage. Therefore, it is possible to reduce the self-discharge amount by decreasing the output voltage of the capacitor 11 from the second voltage to the first voltage after the ignition switch 24 is switched from ON to OFF, compared to, for example, a case where the output voltage of the capacitor 11 is increased.

As described above, according to the vehicle electric power supply apparatus 10 of the present embodiment, with respect to the capacitor 11 which easily self-discharges compared to the battery 12, the controller 14 performs electric power supply from the capacitor 11 to the battery 12 when the ignition switch 24 is switched from ON to OFF and the internal combustion engine 22 is stopped. Thereby, since the output voltage of the capacitor 11 decreases to the first voltage from the second voltage, it is possible to reduce the self-discharge of the capacitor 11 and the dark current associated with the self-discharge compared to, for example, a case where the output voltage of the capacitor 11 remains unchanged or increases.

Specifically, as the period in which the ignition switch 24 is in an OFF state (namely, a stopping state of the internal combustion engine 22) is longer, the period of self-discharging of the capacitor 11 is longer. Therefore, loss occurs in the short term corresponding to the electric power conversion efficiency of the DC-DC converter 13 during discharging of the capacitor 11 to the battery 12, but since the increase of the self-discharge amount is suppressed in the long term, it is possible to improve fuel efficiency.

Note that, the technical scope of the present invention is not limited to the above-described embodiments and a variety of modifications can be made to the above-described embodiments without departing from the scope of the present invention. Accordingly, it should be understood that the configurations in the embodiments described and illustrated above are exemplary of the invention and can be suitably altered.

For example, in the embodiment described above, the DC-DC converter 13 is an H-bridge step-up/step-down DC-DC converter, but the converter is not limited thereto. The converter may be a step-up/step-down DC-DC converter having another configuration.

For example, in the embodiment described above, the contactor 15 may be another switch.

What is claimed is:

1. A vehicle electric power supply apparatus mounted in a vehicle, the vehicle being provided with an internal combustion engine and an operation switch which is used to output a signal that commands starting and stopping of the internal combustion engine corresponding to an operation of an operator, the apparatus comprising:
   a first power source;
   a second power source that is connected in parallel to the first power source;
   a DC-DC converter that is connected between the first power source and the second power source;
   a resistance and a rectifier that are connected between the first power source and the second power source, the rectifier being provided such that a current flows in a direction from the first power source to the second power source;
   a switch that is connected in parallel to the DC-DC converter and is connected between the first power source and the second power source;
   an opening and closing unit that is used to open and close the switch; and
   a control unit that controls the DC-DC converter and the opening and closing unit,
   wherein,
   when the internal combustion engine is stopped corresponding to the signal that is output from the operation switch, the control unit sets the switch to be OFF using the opening and closing unit, and the control unit causes the second power source to be discharged and the first power source to be charged until an output voltage of the second power source reaches a first voltage that is less than a voltage of the first power source, and prevents the output voltage of the second power source from decreasing to less than a minimum safeguard voltage, by electric power supply from the second power source to the first power source via the DC-DC converter.

2. The vehicle electric power supply apparatus according to claim 1, wherein, when the internal combustion engine is operated corresponding to the signal that is output from the operation switch, the control unit sets the output voltage of the second power source to a second voltage that is greater than the first voltage by charging and discharging the second power source via the DC-DC converter.

3. The vehicle electric power supply apparatus according to claim 2, wherein the second voltage is a voltage that is capable of starting the internal combustion engine by a starter motor for driving the internal combustion engine.

4. The vehicle electric power supply apparatus according to claim 2, wherein the vehicle has a system for idle stopping, and power from the second power source is used during the idle stopping for a load of the vehicle until the output voltage of the second power source reaches the second voltage.

5. The vehicle electric power supply apparatus according to claim 1, wherein the rectifier is a diode.

6. A vehicle electric power supply apparatus mounted in a vehicle, the vehicle being provided with an internal combustion engine and an operation switch which is used to output a signal that commands starting and stopping of the internal combustion engine corresponding to an operation of an operator, the apparatus comprising:
   a first power source;
   a second power source that is connected in parallel to the first power source;
   a DC-DC converter that is connected between the first power source and the second power source;
   a switch that is connected in parallel to the DC-DC converter and is connected between the first power source and the second power source;
   an opening and closing unit that is used to open and close the switch; and
   a control unit that controls the DC-DC converter and the opening and closing unit,
   wherein,
   when the internal combustion engine is stopped corresponding to the signal that is output from the operation switch, the control unit sets the switch to be OFF using the opening and closing unit, and the control unit causes the second power source to be discharged and the first power source to be charged until an output voltage of the second power source reaches a first voltage by electric power supply from the second power source to the first power source via the DC-DC converter,
   when the internal combustion engine is operated corresponding to the signal that is output from the operation switch, the control unit sets the output voltage of the second power source to a second voltage that is greater than the first voltage by charging and discharging the second power source via the DC-DC converter, and
   the second voltage is a voltage that is capable of starting the internal combustion engine by a starter motor for driving the internal combustion engine.

7. A vehicle electric power supply apparatus mounted in a vehicle, the vehicle being provided with an internal combustion engine and an operation switch which is used to output a signal that commands starting and stopping of the internal combustion engine corresponding to an operation of an operator, the apparatus comprising:
- a first power source;
- a second power source that is connected in parallel to the first power source;
- a DC-DC converter that is connected between the first power source and the second power source;
- a switch that is connected in parallel to the DC-DC converter and is connected between the first power source and the second power source;
- an opening and closing unit that is used to open and close the switch; and
- a control unit that controls the DC-DC converter and the opening and closing unit, wherein, when the internal combustion engine is stopped corresponding to the signal that is output from the operation switch, the control unit sets the switch to be OFF using the opening and closing unit, and the control unit causes the second power source to be discharged and the first power source to be charged until an output voltage of the second power source reaches a first voltage by electric power supply from the second power source to the first power source via the DC-DC converter, when the internal combustion engine is operated corresponding to the signal that is output from the operation switch, the control unit sets the output voltage of the second power source to a second voltage that is greater than the first voltage by charging and discharging the second power source via the DC-DC converter, and the vehicle has a system for idle stopping, and a power from the second power source is used during the idle stopping for a load of the vehicle until the output voltage of the second power source reaches the second voltage.

* * * * *